Sept. 19, 1961 H. E. McKELVEY 3,000,143
METHOD FOR BENDING GLASS SHEETS
Filed Jan. 4, 1956 2 Sheets-Sheet 1

INVENTOR.
HAROLD E. McKELVEY
BY
Oscar H. Spencer
ATTORNEY

Sept. 19, 1961 H. E. McKELVEY 3,000,143
METHOD FOR BENDING GLASS SHEETS
Filed Jan. 4, 1956 2 Sheets-Sheet 2
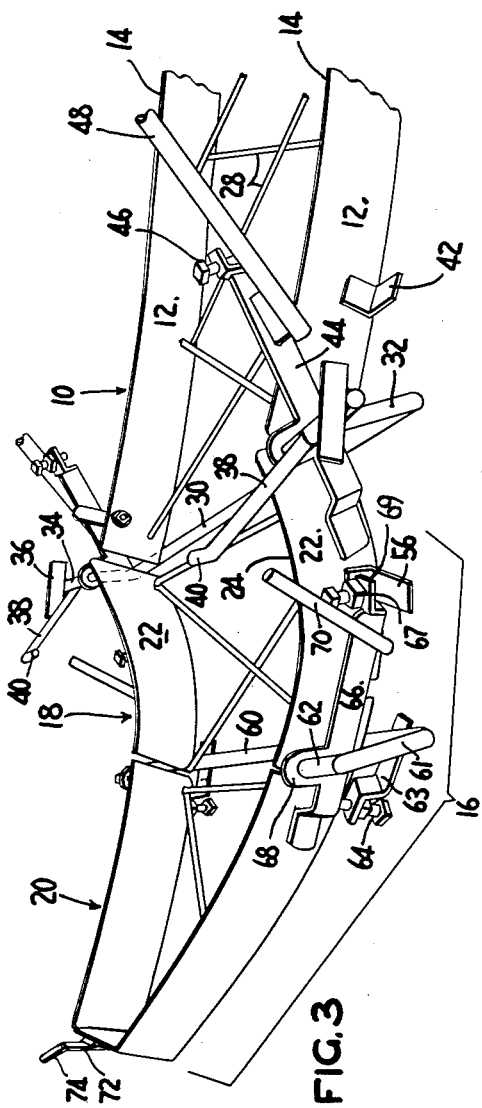
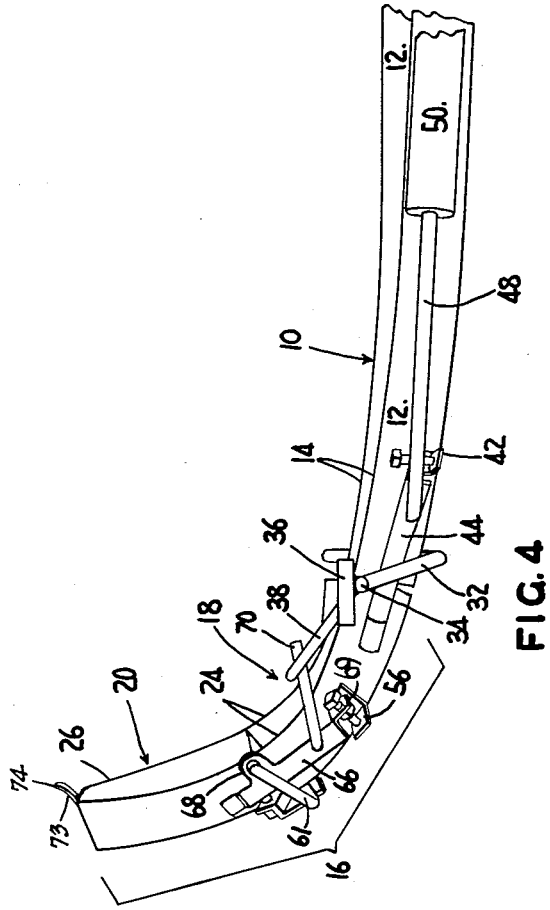
INVENTOR.
HAROLD E. McKELVEY
BY
Oscar L. Spencer
ATTORNEY United States Patent Office 3,000,143
Patented Sept. 19, 1961

3,000,143
METHOD FOR BENDING GLASS SHEETS
Harold E. McKelvey, Rural Valley, Pa., assignor to Pittsburgh Plate Glass Company, a corporation of Pennsylvania
Filed Jan. 4, 1956, Ser. No. 557,361
9 Claims. (Cl. 49—84)

This application relates to a method for bending glass sheets, particularly sheets which are to be bent to complex curvatures having a relatively gently curved central portion merging into regions of severe curvatures and terminating in relatively flat extremities which are bent substantially perpendicularly to the central portion of the sheet.

Conventionally, flat glass sheets are bent into curved shapes by mounting them on sectionalized molds compirsing molding members which are spread open to receive the glass and are capable of moving into a closed mold position to form a substantially continuous frame conforming in elevation and outline to the curvature desired for the bent glass sheet. The glass laden molds are conveyed through a tunnel-like lehr where the glass and the mold are heated uniformly to glass softening temperatures. At these temperatures, the glass softens and the mold moves into its closed position. The bent glass sheet is then annealed or tempered depending upon its further use.

When bending glass to the complex curvatures described above, considerable difficulty is encountered in maintaining the sheet extremities relatively flat while curving the portions immediately longitudinally inwardly of these flat extremities to the severe curvatures required. The present invention provides a method and apparatus which facilitate the obtention of such complex curvatures.

According to the present invention, novel mold structure is provided by sectionalizing the movable end members of a sectionalized mold in a novel manner. The mold elements include a central section comprising a pair of spaced rails of relatively gentle contour conforming in elevation and outline to the curvature desired for the central portion of a glass sheet to be supported on the mold. Flanking each longitudinal extremity of the central molding member is a split molding member. Each split member includes a longitudinally inner section containing severely curved rails conforming in elevation and outline to the severely curved portion to which the glass sheet is to be bent, and a freely rotatable, relatively flat end section of substantially C-shaped contour. The latter section is free to rotate outwardly relative to the longitudinally inner sections within limits determined by stop members.

Each freely rotatable end section supports an extremity of the flat glass sheet mounted for bending on the extended mold. The longitudinal extremities of the rails of the center section provide spaced, intermediate support points for the flat glass. The inner sections of the split members are counterweighted to lift the split mold members and rotate the latter including their inner sections and their end sections in unison when glass sheets mounted for bending on the mold have heated sufficiently to allow softening to take place.

Means are attached to each extremity section to urge the latter into a closed position after the inner sections have substantially completed their movement into their closed positions. Such a structure enables the glass to be bent by first applying an upward thrust to each intermediate region and its adjacent extremity of the glass about a first axis of rotation and subsequently applying additional upward thrusts to the extremities only about a second axis of rotation disposed longitudinally outwardly of the first axis. By limiting the rotation of the extremities of the glass sheets to the final stages of the bending cycle, over-bending of the tips or extremities of the glass sheet is minimized.

A primary object of the present invention is to provide a method for bending flat glass sheets into complex curvatures wherein overbending of the glass extremities is prevented.

Another object of the present invention is to provide a method for bending glass sheets to complex curvatures having a relatively gently curved central portion merging into regions of severe curvatures and terminating in relatively flat extremities which are bent substantially perpendicularly to the central portion of the sheet.

These and other objects of the present invention will become obvious upon studying a particular embodiment of this invention which is described for purposes of illustration rather than limitation. Various modifications not disclosed in the illustration will become obvious upon reading this description. These are included in the claims which accompany this application.

In the drawings forming part of the present invention,

FIGURE 3 shows an enlarged perspective view of a portion of a bending mold opened to receive flat glass sheets.

FIGURE 4 is an elevation showing the portion of the bending mold seen in FIGURE 3 in its closed position.

Figure 1:
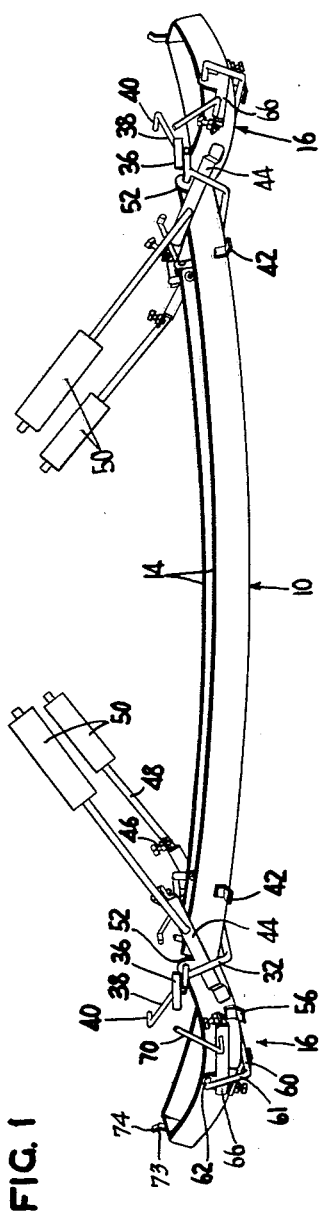
FIGURE 1 represents an elevational view of a bending mold according to the present invention shown in the open position for receiving a flat sheet of glass.
Figure 2:
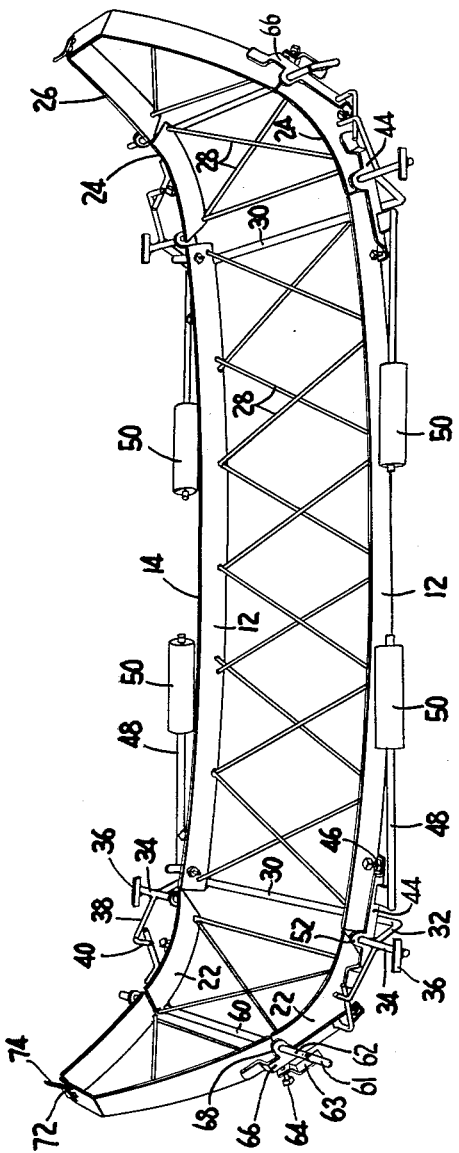
FIGURE 2 represents a perspective view of the mold closed upon completion of the bending cycle.

A typical apparatus includes a central molding member 10 comprising spaced rails 12 having upper shaping surfaces 14 of gently curved contour corresponding to the gently curved contour desired for the margins of the central portions of the bent glass sheet. The bending apparatus also includes sectionalized molding members 16 which are rotatable relative to the center molding member 10. These sectionalized molding members include longitudinally inner or intermediate sections 18 and longitudinally outer or extremity sections 20 (FIGURES 3 and 4).

The intermediate sections 18 each comprise intermediate rails 22 having extremely curved upper shaping surfaces 24. The extremity sections 20 are reversely curved rails of substantially C-shaped configuration and comprise upper shaping surfaces 26. All the mold members are reinforced by suitable criss-cross bracing members 28.

The center molding member 10 includes a pair of cross bars 30 interconnecting the longitudinal extremities of opposite rails 12. These cross bars extend laterally beyond the mold rails to form upturned ends 32 which are welded to support bars 34. Adjacent the lateral outboard extremity of each support bar 34 is a flange guide 36. These flange guides are helpful to guide mounting the molds on mold support carriages which are used to convey the molds through the tunnel-like bending lehr mentioned above.

Also welded to the support bars 34 are outwardly and upwardly extending fingers 38. These fingers terminate in turned ends 40. The purpose of these turned ends will be described in greater detail subsequently.

An inwardly extending strap 44 is connected to the outside of each of the intermediate rails 22. They are flanged and apertured adjacent their inner extremities to receive adjustable stop nuts 46. Counterweight arms 48 provided with counterweights 50 adjacent their inner extremities are welded to the straps 44. The straps also comprise an apertured ear 52 which forms a bearing connection about support bar 34. The intermediate section is provided with a stop flange 56 for purposes to be described later.

Each intermediate section 18 is provided with a cross bar 60 which terminates in an upturned portion 61 and a reentrant stub bearing rod 62. Z-shaped strips 63 extend outboard of the extremities of the cross bars 60 to which they are fixed. The strips are apertured at their outer extremities to receive adjustable stop nuts 64.

Each side of each extremity section 20 is provided with a strap 66 that extends longitudinally inwardly of its point of connection with the extremity section. The straps are provided with apertured ears 68 which receive the stub hinge rods 62, thereby enabling the extremity sections 20 to rotate relative to the intermediate sections 18. An adjustable stop nut 67 is mounted through an apertured offset flange 69 carried at the longitudinally inner extremity of each strap 66. A finger 70 extends inwardly and upwardly from strap 66.

At the longitudinally outer extremity of each longitudinally outer section 20 there is a guide 72 for the glass extremity. The guide comprises a finger 73 rigidly secured to the outer surface of the mold extremity and extending upwardly therefrom along a slightly outwardly and upwardly directed axis. The finger is bent at its upper portion to form an oblique extension 74 to provide a guiding surface to insure proper loading. The oblique extension minimizes the danger of glass fracture at its extremities by providing a bearing surface along which the glass may be slid for loading in the event it is misaligned slightly relative to the open mold during loading.

The operation of the mold in bending glass to complex curvatures will now be described in order to explain how the present invention improves the production of complex curvatures.

The mold 10 is first loaded onto a mold support carriage. Then, the sectionalized molding members 16 are rotated about a first axis defined by support bars 34 into a spread position to receive the flat glass. In this position, the extremity sections 20 are also rotated relative to the intermediate sections 18 about a second axis defined by stub hinge rods 62 an amount limited by abutment of the strap 66 against the upper surface of the adjustable stop nuts 64.

After the glass is loaded on the mold at a loading station at the entrance of a tunnel-like glass bending lehr, the glass laden mold is conveyed on its mold support carriage through the lehr. The glass and mold are subjected to gradually increasing temperatures until the glass attains glass softening temperature.

Softening of the glass permits the counterweights 50 to rotate the sectionalized molding members 16 about the bearings formed between the ears 52 and the support bars 34. The extremity sections 20 are forced to rotate with the intermediate sections 18 because of the continued engagement of the underside of the straps 66 with the adjustable stop nuts 64. Fingers 70 rotate with strap 66 during the rotation of the sectionalized molding members 16.

Toward the end of the bending cycle, the fingers 70 come into sliding contact with the inner surface of the turned ends 40 and act as cooperating cam members of cam means. This sliding contact causes the extremities 20 to rotate into a closed mold position limited by the abutment of adjustable stop nuts 67 against the stop flanges 56 carried by each intermediate section 18. Rotation of the sectionalized molding members 16 relative to the center molding member 10 is limited by the abutment of the adjustable stop nuts 46 of the straps 44 carried by the intermediate sections 18 against the stop bar flanges 42 carried by the center rails 12 of the center molding member 10.

The action that takes place during the bending cycle causes the lifting of each intermediate region and its adjacent longitudinal extremity of the softened flat glass sheet about a first axis of rotation relatively distant from the extremities of the glass sheet and defined by the support bars 34, followed by additional lifting of the extreme tips of the longitudinal extremities of the glass about second axes of rotation relatively close to the extremities of the glass sheet and defined by the stub hinge rods 62. By inhibiting the latter rotation until the very end of the bending cycle, overbending of the glass tips is inhibited and the bent glass sheet is more easily located within an automotive frame, because it is more likely to be bent within the allowed tolerances. Furthermore, since overbending of the tips is prevented by virtue of the controlled bending provided by the present invention, there is less likelihood of breakage at the tips of the glass sheets to be bent and subsequently laminated, because there is less likelihood of mismatched areas due to uncontrolled bending of the tips.

The extremity sections 20 have their weight so distributed that they normally tend to rotate to their outer positions when the mold is spread to receive flat glass. Such freedom to rotate in its outer position facilitates loading of the glass sheet.

When the adjustable stop nuts 46 and 67 contact the stop flanges 42 and 56, respectively, the mold provides a substantially continuous frame conforming in elevation and outline to the shape desired for the bent glass sheet. Immediately upon the attainment of such a curvature in the glass, the glass must be cooled rapidly to the annealing range, or chilled suddenly if the glass is desired to be tempered. Maintaining the glass at glass softening temperatures for too long a period causes undesired sagging of the glass.

What is claimed is:

1. A method of bending glass sheets into complex curvatures having a relatively gently curved central portion merging into intermediate regions of severe curvatures and terminating in relatively flat extremities adjacent each intermediate region comprising mounting a glass sheet in bending relation to a shaping surface, subjecting the glass to glass softening temperatures, applying an upward thrust to lift each intermediate region and its adjacent extremity of the glass about a first axis of rotation as the glass softens upon exposure to glass softening temperature and subsequently starting and continuing to apply an additional upward thrust to each glass sheet extremity about a second axis of rotation disposed longitudinally outwardly of said first axis during the final stage of the bending cycle.

2. The method according to claim 1, wherein the upward thrusts applied to lift the intermediate regions and extremities are continued while applying the additional upward thrusts to the glass sheet extremities.

3. The method according to claim 1, wherein the glass sheet is supported at spaced points of support when initially mounted in bending relation to a shaping surface.

4. A method of bending glass sheets into complex curvatures having a relatively gently curved central portion merging into intermediate regions of severe curvature and terminating in relatively flat extremities comprising mounting a glass sheet in bending relation to a shaping surface, applying bending moments to the glass about spaced axes of rotation relatively distant from the glass sheet extremities as the glass softens upon exposure to glass softening temperature and subsequently starting and continuing to apply bending moments about spaced axes of rotation relatively close to the glass sheet extremities of the glass sheet.

5. A method according to claim 4, wherein the first bending moments are continued while applying the subsequent bending moments.

6. A method according to claim 4, wherein the glass sheet is supported at spaced points of support when initially mounted in bending relation to a shaping surface.

7. A method of bending glass sheets into complex curvatures comprising a relatively flat extremity merging into a sharply curved intermediate region and the latter adjoining a gently curved portion comprising supporting a flat glass sheet in bending relation to a shaping surface, exposing the glass sheet to glass softening temperatures, applying a bending moment to the glass about an axis of rotation relatively distant from the glass sheet extremity, and subsequently starting and continuing to apply bending moment to the glass about an axis of rotation relatively close to the glass sheet extremity.

8. A method according to claim 7, wherein the first bending moment is continued while supplying the subsequent bending moment.

9. A method according to claim 7, wherein the glass sheet is supported at spaced points of support when initially mounted in bending relation to a shaping surface.

References Cited in the file of this patent

UNITED STATES PATENTS

| | | |
|---|---|---|
| 1,920,528 | Butler et al. | Aug. 1, 1933 |
| 1,999,558 | Black | Apr. 30, 1935 |
| 2,317,904 | Galey | Apr. 27, 1943 |
| 2,486,153 | Gwyn | Oct. 25, 1949 |
| 2,554,572 | Jendrisak | May 29, 1951 |
| 2,608,799 | Babcock | Sept. 2, 1952 |
| 2,633,673 | Bamford | Apr. 7, 1953 |
| 2,682,730 | Rossen | July 6, 1954 |
| 2,691,854 | Rugg | Oct. 19, 1954 |
| 2,737,758 | Jendrisak | Mar. 13, 1956 |
| 2,774,189 | Jendrisak | Dec. 18, 1956 |
| 2,861,396 | Richardson | Nov. 25, 1958 |

FOREIGN PATENTS

| | | |
|---|---|---|
| 1,089,973 | France | Oct. 13, 1954 |